United States Patent [19]
Inglis

[11] 3,875,056
[45] Apr. 1, 1975

[54] DEVICE FOR SEWAGE TREATMENT
[75] Inventor: Douglas Johnstone Inglis, Aberdeen, England
[73] Assignee: Stenberg-Flygt AB, Solna, Sweden
[22] Filed: Nov. 10, 1972
[21] Appl. No.: 305,394

Related U.S. Application Data
[63] Continuation of Ser. No. 84,706, Oct. 27, 1970, abandoned.

[30] Foreign Application Priority Data
Jan. 27, 1970 Sweden.............................. 1010/70

[52] U.S. Cl.................... 210/93, 210/109, 210/138, 210/220, 210/532
[51] Int. Cl.............................................. C02c 1/18
[58] Field of Search .......... 4/209, 211, 213; 210/15, 210/16, 63, 94, 95, 138, 139, 152, 220, 251, 210/532 S, 103–105, 109, 134, 135, 93, 210/144, 142, 244

[56] References Cited
UNITED STATES PATENTS
| | | | |
|---|---|---|---|
| 1,298,584 | 3/1919 | Shaw...................................... | 4/213 |
| 3,056,742 | 10/1962 | Beaumont............................. | 210/15 |
| 3,327,855 | 6/1967 | Watson et al.................... | 210/152 X |
| 3,391,789 | 7/1968 | Zievers et al......................... | 210/95 |

Primary Examiner—Thomas G. Wyse
Attorney, Agent, or Firm—Sughrue, Rothwell, Mion, Zinn & Macpeak

[57] ABSTRACT

A sewage treatment process and plant in which the process takes place in a single chamber operating on a cycle conforming to the daily sewage discharge cycle of a household. Sewage enters the chamber and is continuously aerated during the peak load daytime hours, while the quiet night hours are used for sedimentation and then removal of the clear liquid supernatant after which the remaining sludge is aerated in readiness for the next day's flow of sewage.

7 Claims, 7 Drawing Figures

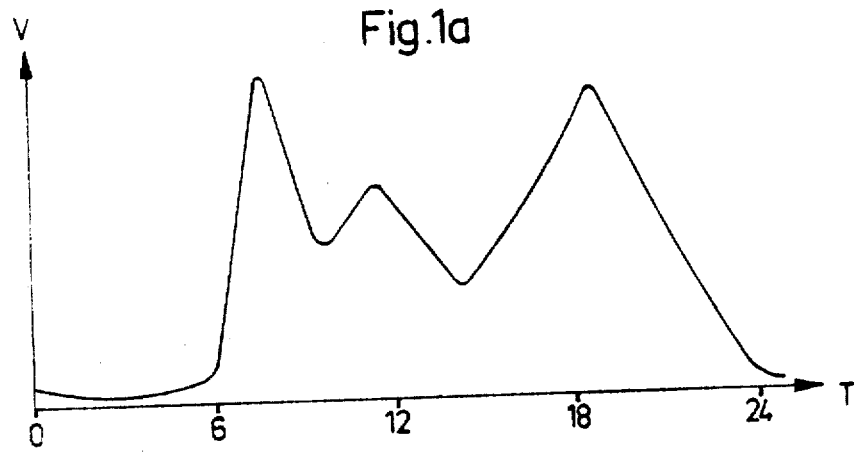
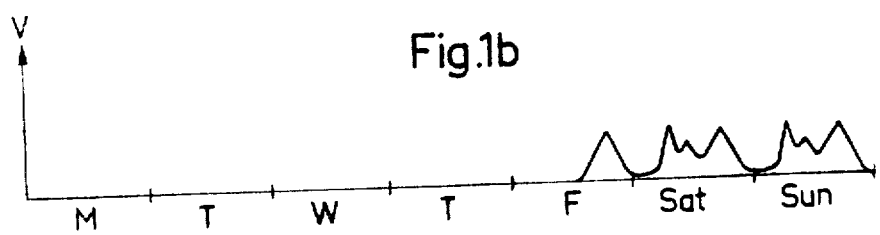
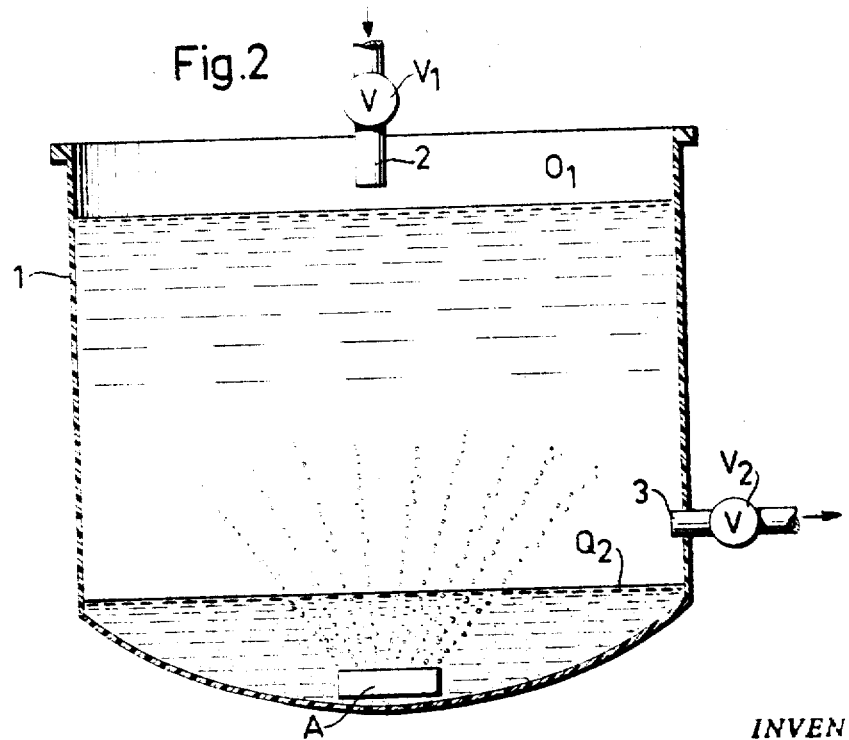

DEVICE FOR SEWAGE TREATMENT

This is a continuation of application Ser. No. 84,706, filed Oct. 28, 1970, now abandoned.

BACKGROUND OF THE INVENTION

The invention relates to a device for sewage treatment.

According to known procedures and devices of the kind, the sewage water and/or sludge is subjected to a series of treatment stages in a continuous manner, each stage in the series being performed in a separate tank or in a separate compartment of a tank subdivided into a number of compartments. Thus, in the known procedures and systems, the normal stages of mixing, aeration, sludge sedimentation, sludge re-aeration, etc. are performed in a series of chambers, the retention time or velocity of flow through each chamber being dependent on the volume of the chamber in relation to the volume of liquid sewage under treatment. The total volume of any such plant is the aggregate of the volumes of the separate compartments. Transfer of liquid sewage from one chamber to another requires baffled orifices, air-lifts, pumps or pipe-lines, either to ensure continuity of flow or to overcome head losses within the plant.

SUMMARY OF THE INVENTION

The present invention is intended to simplify the procedure and reduce equipment costs especially for aerobic sewage treatment, and consists essentially in the fact that the flocculation in and aeration of the incoming liquid sewage and sludge, and the sedimentation of the latter under simultaneous clarification of the supernatant, is performed batchwise in a single tank or chamber to comply with the daily rhythm of a household of similar unit, or small group of such units, so that during the part of the day when the inflow of liquid sewage and sludge is greatest, that is, largely between 6:00 A.M. and midnight (or 5:00 A.M. and 1:00 A.M.), the liquid and sludge in the chamber are aerated under flocculation and oxygenation, and possibly addition of chemicals, e.g. for phosphate reduction, whereas during the night hours, e.g. between midnight and 2:00 A.M., the aeration is interrupted and the sludge is allowed to settle and, for example between 3:00 and 4:00 A.M., the clarified liquid is led off, after which the sludge remaining in the chamber is aerated for reactivation between, for example 4:00 and 5:00 or 6:00 A.M., so that it is in good condition when new liquid sewage starts to flow into the tank in the mornings, after which the process is repeated.

The invention may be used in weekend residences in which case the cycle operates normally during the weekend while the return is quiescent during the week except for a half day of aeration immediately preceding the weekend.

The invention includes a device for execution of the procedure, characterized by a single chamber in which the liquid sewage and sludge from a connected household unit or the like, or group of such units, in batches corresponding to the daily rhythm, are aerated by an aerating device consisting of a blower and of an aerator arranged in the chamber, are flocculated and oxygenated, and thereafter the sludge is sedimented during the early hours of the night under simultaneous clarification followed by discharge of the supernatant, and the remaining sludge is thereafter re-aerated and reactivated during the later part of the night, the chamber having an inlet pipe and an outlet pipe and a discharge unit in conjunction with the latter.

According to a further development of the device according to the invention the discharge unit consists of a valve, which may be actuated by the pressure developed in the chamber by means of the aerating device.

According to another modification of the invention the discharge unit consists of a suitably immersible pump unit, the pressure pipe of which may be connected to the outlet pipe from the chamber, possibly as a spillway.

According to a further embodiment of the invention an excess load compartment which can be closed off from the chamber is arranged in conjunction with the inlet pipe for reception of any liquid sewage flowing in at nighttime.

In accordance with another embodiment of the invention the blower may be used to increase the pressure in the chamber possibly via a separate pipeline with valve, for tapping of clarified liquid or sludge.

For timing the operation of the plant and the treatment of the daily batch of liquid sewage in accordance with the daily rhythm of the group of households, the plant has a timer having cam discs, for example one for the continuous daily rhythm throughout the year, one for the continuous daily rhythm during the summer half-year, and another for brief aerations during the winter half-year, possibly interspersed with 2½ day continuous daily rhythm.

Finally, according to an especially economical embodiment of the invention, the blower, aerator, discharge unit and timer can be arranged on a dome-like cover for placing on an existing septic tank under immersion of the aerators and possibly also of the discharge unit in the liquid sewage in the tank.

The timer may be replaced by a level-sensing unit set for a morning level and evening level in the tank, specific to each plant.

BRIEF DESCRIPTION OF THE DRAWINGS

FIG. 1a shows a typical daily curve of liquid sewage flow for a household or small group of households;

FIG. 1b is a typical weekly curve of liquid sewage flow for a weekend cottage;

FIG. 2 is a schematic drawing of a device embodying the present invention;

DESCRIPTION OF THE PREFERRED EMBODIMENTS

Figure 3:
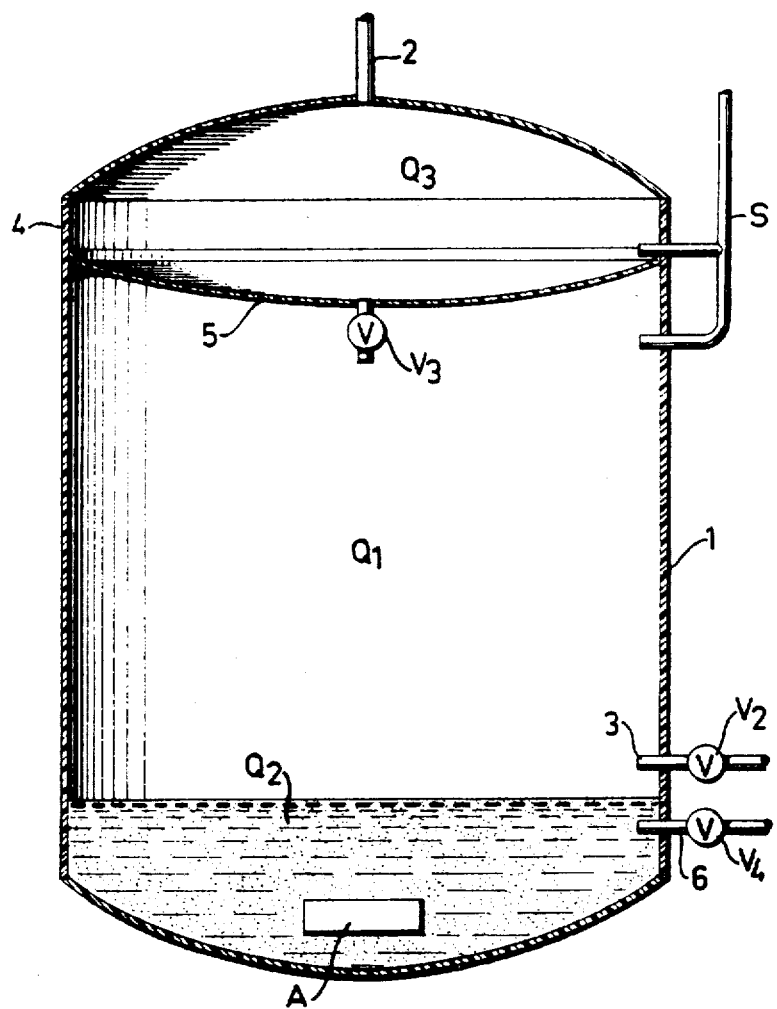
FIG. 3 is a schematic drawing of another embodiment of the invention.

FIG. 1 shows a typical daily curve of the variation in flow of liquid sewage from a household or small group of households as a function of time. As is seen, there are peaks during the early morning hours and in the evening when showers, baths and meals result in an increased flow of waste water. Such a curve is typical of different types of sewage systems both municipal and industrial, although the curve is better defined for private households and small groups of households. Similarly, minimal flows during the hours of darkness are again typical of private households, and in actual fact the flow of sewage usually ceases during the night hours.

Relatively quiescent conditions are required during only one stage of sewage treatment—that of sedimentation. Conventional practice in liquid waste treatment allows a sedimentation period or sedimentation tank retention time, of from one to four hours duration. Other stages of conventional processing require an aggregate duration of less than 24 hours. Thus, if the sedimentation, or quiescent, period of less than four hours can take place during the hours when incoming flow virtually disappears, all other stages of the process can be performed during hours when the turbulence caused by incoming flow will not be detrimental to treatment efficiency and, in fact, for some purposes, may contribute to such efficiency.

FIG. 1b shows a typical weekly curve of liquid sewage flow for a weekend cottage. Here there is an afternoon peak on Friday and a normal daily curve on Saturday and Sunday.

FIG. 2 illustrates the invention schematically. It shows a tank 1 of capacity Q, being sufficiently large to contain the daily flow of liquid sewage and remaining sludge from a one-family house or group of such houses. The inlet pipe 2 has a valve V1 and the outlet pipe 3 a valve V2. At the bottom of the tank is an aerating device A by means of which air is introduced to the tank to sustain the biological process in the sludge. Valve V1 is opened at 5:00 A.M. and the incoming flow, which causes the volume of liquid in the tank to increase throughout the day, is continuously or intermittently aerated by means of the aerator A until 1:00 A.M. on the following day. At this time valve $V_1$ closes to prohibit the entry of additional waste, and aeration through aerator A is discontinued. From 1:00 A.M. until 4:30 A.M. the system is quiescent, permitting solids sedimentation to take place. This develops a sludge accumulation Q2 at the bottom of the tank and a clarified supernatant liquor volume (Q1–Q2) above the sludge accumulation. At 4:30 A.M. valve $V_2$ is opened to permit the clarified, biologically treated, supernatant liquor to escape from the plant. By 5:00 A.M. only the sludge accumulation remains in the tank, valve V2 is closed, valve V1 opened, aeration through aerator A commences, and the cycle is repeated. It is significant that during the first few hours of the new day, before the rate of flow to the plant is significantly increased, only the sludge is being aerated, thus producing a specific sludge aeration and re-aeration stage, as attained in a more complicated manner in conventional processing. It should perhaps also be noted that the above time cycle is typical only. Actual duration of the various stages and the hours at which they commence can be varied to suit the daily flow pattern of a particular case and the operating conditions producing optimum treatment results.

Thus as noted, in weekend cottages in the wintertime, one can have the treatment plant operating for 2½ days at the weekend, but merely brief aeration on other days.

Three refinements to the above outlined basic process and system are desirable:

1. The tank should be closed for reasons of hygiene.
2. Provision should be made for storage of liquid wastes and sludge during night hours to prevent their having a deterimental effect on the sedimentation process in the plant.
3. It should be possible to withdraw surplus sludge from time to time.

FIG. 3 shows one embodiment having these refinements. Here again there is a tank 1 with volume Q1, an inlet pipe 2 and an outlet pipe 3 with a valve V2. A compartment 4 with volume Q3 has been added to the main chamber, being separated from the latter by a bottom 5. In the bottom 5 there is a valve V3, which connects the storage compartment with the main compartment of the tank. Vent pipes S are provided for aeration of the two compartments. The lower compartment is intended for sludge accumulation, the volume of which may be Q2. In this part of the tank there is a discharge pipe 6 with a valve V4 for withdrawal of excess sludge.

It should perhaps be pointed out that the excess load chamber 4 does not constitute a treatment chamber and is located adjacent to the treatment chamber to permit manufacture as a single tank unit.

The device shown in FIG. 3 functions as follows. At, say, 5:00 A.M. valve V3 is opened and starts operation of aerating device A. Valves V2 and V4 are closed. From 5:00 A.M. to 1:00 A.M. on the following day, sludge aeration and sewage aeration are carried out as previously described. At 1:00 A.M. valve V3 closes, thus isolating the excess load chamber 4 from the main chamber and aeration ceases. The sedimentation period starts and continues until 4:30 A.M., at which time valve V2 opens to release the clarified supernatant. This being done, valve V2 closes, V3 opens, allowing any excess load accumulation in chamber 4 to run down into the main treatment chamber; aeration by means of the aerator A commences and the entire cycle is continued in the manner described. Valve V4 is provided to permit the occasional withdrawal of accumulated surplus sludge from the plant. It should be noted that to improve performance it may be desirable to stagger the closing of valve V3 and the cessation of aeration prior to the sedimentation cycles. The closing of, for example, valve V2 before opening of valve V3 may also be arranged, with a brief, timed emptying of excess sludge through valve V4.

Particularly in the case of underground installations it may be desirable to discharge both clarified effluent and surplus sludge under pressure, thus permitting discharge lines at shallow depth. This would, in such cases simplify the withdrawal of sludge for disposal and also would permit the use of sub-surface drainage beds for filtrations, so obtaining additional purification of the treatment and clarified liquid sewage.

Figure 4:
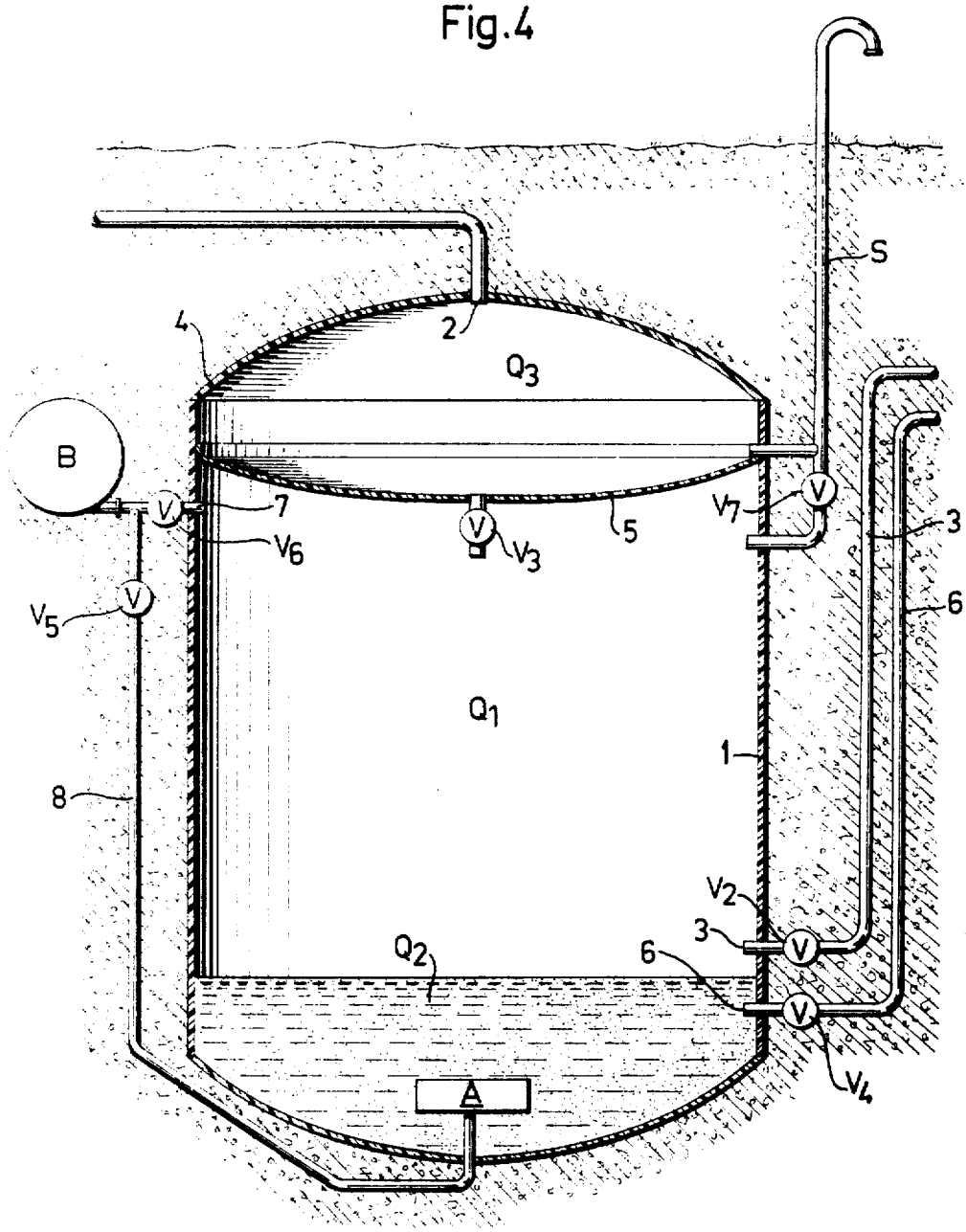
FIG. 4 is a schematic drawing of another embodiment of the invention.

As shown in the embodiment of FIG. 4, a blower B supplies air to the aeraton 50 via pipe-line 8 and valve $V_5$ while the treatment chamber 1 can be supplied with compressed air via a pipe-line 7 between the blower and this chamber and a valve V6. In this way the air can be allowed to go direct either to the aerator A or to the treatment chamber 1. The vent pipe S is also provided with a valve V7.

The device functions as follows. If we consider that part of the operating cycle previously described where the sedimentation period has elapsed, it can be seen that by closing valves V5 and V7 (V3 being closed and V2 open at this point) and opening valve V6, air is introduced under pressure to the upper part of chamber 1, thus discharging the clarified supernatant through valve V2 under the blower pressure. For the sake of simplification of the valving system, it may be desirable to initiate this pressurizing step at the beginning of the sedimentation cycle, using the pressure to operate simple valving systems at V3 and V7.

It can be seen that a similar pressurizing technique can be applied to discharge sludge through pipe-line 6 and valve V4 (valve V2 being closed) if required.

Figure 5:
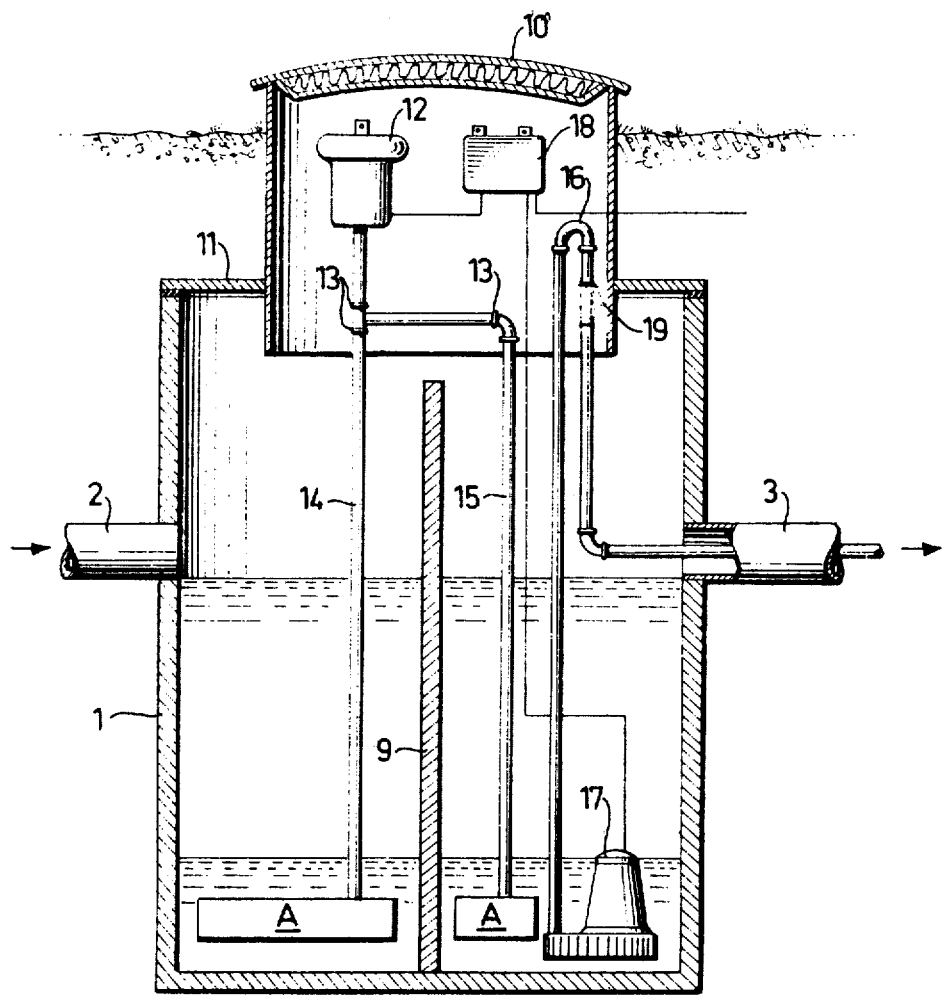
FIGS. 5 and 6 are two other, somewhat simplified embodiments of the invention.

FIG. 5 shows an embodiment which can be used when a water purification plant is to be combined with, for example, an existing septic tank, in which case either the air pressure technique described above can be used for emptying the tank or, as shown in this figure, a submersible pump unit can be used for this purpose.

In the embodiment shown the septic tank is denoted 1, the liquid sewage being introduced through an inlet pipe 2. The tank also has an outlet pipe 3. The tank may be either constructed without partition walls or may have a partition wall 9 as shown in the figure. The wall 9 has an orifice, not shown on the drawing, for equalization of the liquid levels. The entire treatment device is constructed in the form of a dome-like cover 10 with a flange 11 which can be fitted tight to the upper edge of the septic tank 1. Inside the cover 10 is the blower 12, the outlet pipe 14 of which is secured to the cover by clamps 13. An aerating device A is secured to the lower end of the outlet pipe. From pipe 14 there runs a pipe 15, also with an aerator A, this pipe being likewise secured to the cover 10 by clamps 13. In the cover there is also an outlet pipe 16, secured by clamps 19, from an immersible pump 17 submerged in the tank, the pump being suspended in the cover 10 by a chain not shown in the figure. The electrical lead to the pump motor can, with the suspension chain, also be carried up to the cover and connected there to an electrical cabinet 18, which also contains a timer for controlling of the various steps of the treatment process. The pressure pipe 16 of the pump 17 is run in hairpin form and, as stated, secured to the cover 10 by clamps 19. The pipe 16 thereafter runs down and terminates in the outlet pipe 3. The effect of this treatment device is the same as described for the device shown in FIG. 3, with the exception that it has a pump 17 as discharge unit instead of a valve V2.

Figure 6:
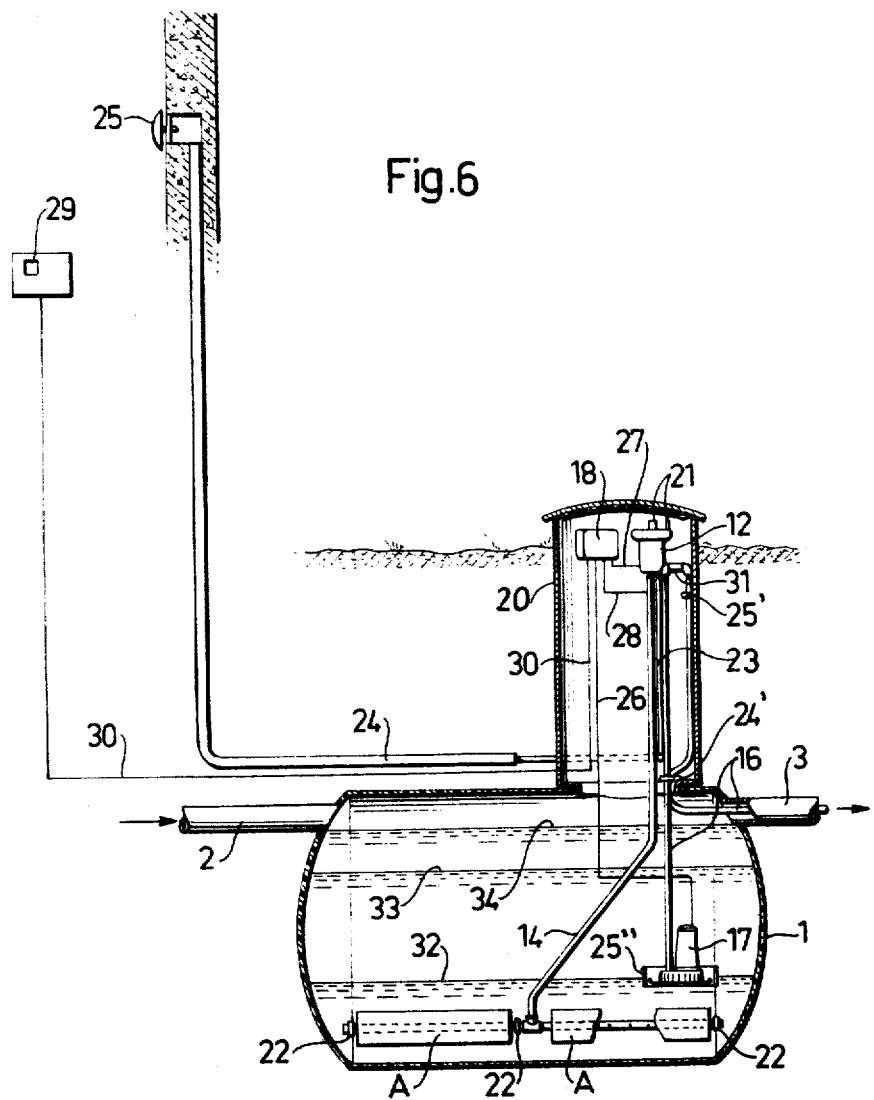

In the particularly preferred embodiment of the invention shown in FIG. 6 the treatment chamber consists of a horizontal plastic tank 1 and a plastic access column 20 bolted over an opening in the top of the tank. A blower 12 is suspended in the column by means of clamps 21 and has an outlet pipe 14 terminating in two aerators A which are secured to the wall of the tank by clamps 22. The suction pipe 23 of the blower is connected to an evacuation pipe 24 from an evacuation valve 25 in the one-family house from which the liquid sewage comes, or from the nearest of a group of such houses. The pipe 2 delivers sewage to the tank. A weir overflow 3 may be provided. Since the blower is supplied with air at room temperature, it will always work with the same efficiency. At the same time the toilet will be ventilated. The pump 17 is suspended in the column 20 by means of the pressure pipe 16. This pipe runs in a hairpin bend up into the column and then to an outlet leading to an irrigation field. By means of clamps 24', 25' a fully stable suspension is ensured. The pump 17 is provided with a wire netting cage 25" which prevents clogging of its inlet orifice. Its electrical lead 26 is connected to an electrical control cabinet 18 with a supply lead 27 to the blower and an incoming supply lead 28. By means of the pump lead 26 the pump can be switched on and off by the lead 27. At a suitable point in the one-family house there is a timer 29 which permits the working program for the plant to be switched from for example, continuous daily flow to continuous daily flow only 2½ days at the weekend. The electrical timer 29 and the control 18 controls the operation of the system. At the top of the column the pressure pipe 16 of the pump has a transparent portion 31 which, after completion of pumping, retains part of the pumped liquid, so that a constant check on the degree of clarification of the pumped liquid is obtained. A morning level 32, and an evening level 33 and an overflow level 34 are marked in the tank by broken lines. The device functions as follows.

The treatment proceeds on the continuous daily flow pattern or continuous daily flow for 2½ days at the weekend as in the devices described hereinabove. Accordingly, during the daytime, when the households discharge their liquid sewage, the sewage accumulates in tank 1 so that the level rises from the morning level 32 but does not attain the overflow level 34. During this phase the sewage is aerated by the two aerators A, which are supplied with air from the blower 12. At a certain hour of the night, when it may be expected that very little or no sewage comes from the household or households, the blower 12 is stopped by the timer 29. During a period of about 3 hours the sewage is left to settle without aeration. The active sludge then sinks to the bottom of tank 1 and the clarified supernatant is thereafter pumped out of tank 1 by the pump 17. The switching on and off of the pump is also controlled by the timer 29. The pump can either be stopped by the timer and/or a level-sensing unit set in such a way for the particular plant that disconnection takes place at a level 32 corresponding to a given hour in the morning. Usually the pump will run for approximately 30 minutes. After the pump 17 has completed its work, the level has been pumped from the evening level 33 to morning level 32. The active sludge is thereafter re-aerated in a fourth phase of the treatment through starting of the blower 12 by the timer 29. The sludge is thus reactivated in readiness for the next day's flow of sewage.

The treatment plant may thus be said to work in four phases:

1. storage of liquid sewage and sludge under aeration,
2. sedimentation,
3. pumping, and
4. re-aeration (reactivation) of the sludge.

As the blower, as noted, draws its air from a disc valve 25 in the toilet in the house nearest to the treatment tank, the advantage is gained that the fan is always supplied with air of essentially the same temperature at all seasons of the year and the toilet is ventilated. The extra advantage is thus gained that, as the ventilation in the toilet preferentially constitutes the sole ventilation, the residents in the house can immediately give warning if the blower 12 has stopped and the treatment plant has thus ceased to function.

As the treatment tank has been made in longitudinal form, an inlet valve on the inlet pipe can be avoided since, in this connection, it is always a question of evening level in the tank and any inflow of liquid reaches the liquid surface close to one end of the tank and therefore cannot appreciably affect the sedimentation process which is in progress in the tank. A baffle in the tank may be provided to prevent swirling which might allow the pump to suck in sludge.

In order to prevent upsetting the daily cycle in the event of a power failure, the timer features a synchronous motor which continues to run for up to 12 hours after power failure.

While I have described above the principles of my invention in connection with specific apparatus it is to be clearly understood that this description is made only by way of example and not as a limitation to the scope of my invention as set forth in the accompanying claims.

I claim:

1. An apparatus for the biological treatment of liquid sewage from a household toilet or similar unit utilizing the variations in the flow of liquid sewage in the course of a day in order to utilize periods of non-use of the toilet unit for the sedimentation of sludge formed or contained in the liquid sewage and for drawing off clarified supernatant liquid, said apparatus comprising
   a. a generally horizontal tank for receiving, collecting and treating liquid sewage, said tank having a generally horizontal top and upstanding end walls;
   b. a continuously open sewage inlet conduit opening into one upstanding end wall at the top thereof in the vicinity of said horizontal top;
   c. a weir overflow conduit connected to the end wall of said tank opposite said end wall to which said sewage inlet conduit is connected, the highest point at which said weir overflow conduit is connected through said opposite end wall being equal to the height of the opening of said inlet conduit and determining an overflow level within said tank;
   d. an aerating device including an aerator located near the bottom of said tank for aerating the contents of said tank;
   e. a control unit for controlling operation of said aerating device;
   f. a pump within said tank for draining liquid from said tank;
   g. conduit means leading from said pump to the exterior of said tank for draining the liquid from the tank;
   h. motor means operatively connected to said pump to drive same; and
   i. means to operate said control unit cyclically to control the function of the aerating device in at least three stages in the course of a day including a first stage during which the liquid sewage continuously collects in the tank and is aerated with subsequent flocculation and sludge formation, a second stage which is chosen to coincide with the periods of non-use, during which non-use aeration is interrupted and the sludge formed is permitted to settle on the bottom of the tank, and a third stage during which the pump draws off clarified supernatant liquid from above the settled sludge; said pump being positioned in said tank above the level of said aerator and below the weir overflow conduit and providing two operating liquid levels within said tank, the first liquid level being above the aerator and corresponding to said third stage of operation, the second liquid level being a level intermediate said first liquid level and below the overflow level within said tank, said second level being provided during said second stage of operation and being positioned sufficiently above said first level such that liquid sewage possibly flowing into said tank from said sewage inlet conduit, during the periods of nonuse does not interfere with sedimentation of sludge or with the discharging of clarified supernatant by pump.

2. An apparatus according to claim 1, wherein the aerating device also includes a high-pressure blower, said control unit including a timer for controlling the aerating device and the pump in a predetermined cycle of operation.

3. An apparatus according to claim 2, wherein the control unit includes elements for determining the levels of liquid in the tank, means connecting said elements to the timer for controlling the level of liquid in the tank at said two levels dependent on use of the toilet unit.

4. An apparatus according to claim 2, including a cover element containing said blower, aerator, pump and control unit, said cover element being mounted on said tank, whereby the aerator and pump can be lowered, during mounting, to a predetermined level in the tank.

5. An apparatus according to claim 4 wherein said blower, aerator and pump are connected to said cover element.

6. An apparatus according to claim 2 further including an evacuation pipe connected between a valve located exteriorly of said tank and said blower whereby said blower is provided with air at substantially the same temperature regardless of climatic conditions.

7. An apparatus according to claim 6 further comprising a transparent section in said conduit means to permit a visual check on the degree of clarification of the pumped liquid.

* * * * *